United States Patent [19]

MacDougall

[11] Patent Number: 4,975,796
[45] Date of Patent: Dec. 4, 1990

[54] REVERSE DISCHARGE DIODE CAPACITOR

[75] Inventor: Frederick W. MacDougall, Marion, Mass.

[73] Assignee: Aerovox Incorporated, New Bedford, Mass.

[21] Appl. No.: 257,833

[22] Filed: Oct. 13, 1988

[51] Int. Cl.⁵ .............................................. H02H 7/16
[52] U.S. Cl. ........................................ 361/16; 361/17; 361/275; 320/1
[58] Field of Search .................. 361/15, 16, 17, 272, 361/275; 320/1

[56] References Cited

U.S. PATENT DOCUMENTS

| | | | |
|---|---|---|---|
| 3,041,501 | 6/1962 | Willits | 361/16 X |
| 3,969,655 | 7/1976 | Gertsch | 361/16 |
| 4,404,622 | 9/1983 | Cherry | 320/1 X |
| 4,530,550 | 7/1985 | Kondo | 320/1 X |
| 4,672,289 | 6/1987 | Ghosh et al. | 320/1 X |
| 4,703,385 | 10/1987 | Stenström | 361/16 |

Primary Examiner—Derek S. Jennings
Attorney, Agent, or Firm—Fish & Richardson

[57] ABSTRACT

A device which enables a self-healing capacitor with more than one group of sections in series to undergo repetitive clearing without generating the resulting potential differences between the series sections which causes additional failures. In one embodiment, the device to conduct charge is a diode and resistor connected across each group of parallel sections so as to be nonconducting when the capacitor is charged but to become conducting when a clearing event occurs. An additional aspect of the device is a method for charging such a capacitor so that no section is overcharged.

6 Claims, 3 Drawing Sheets

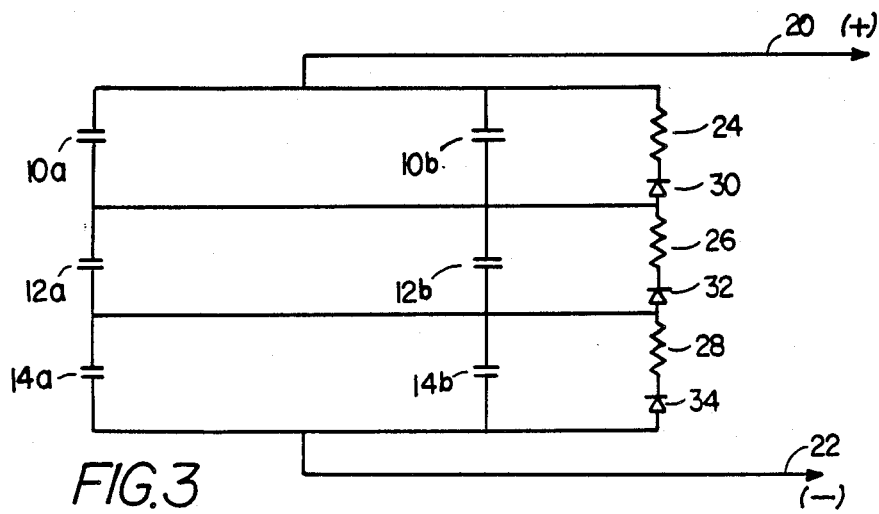
FIG. 3
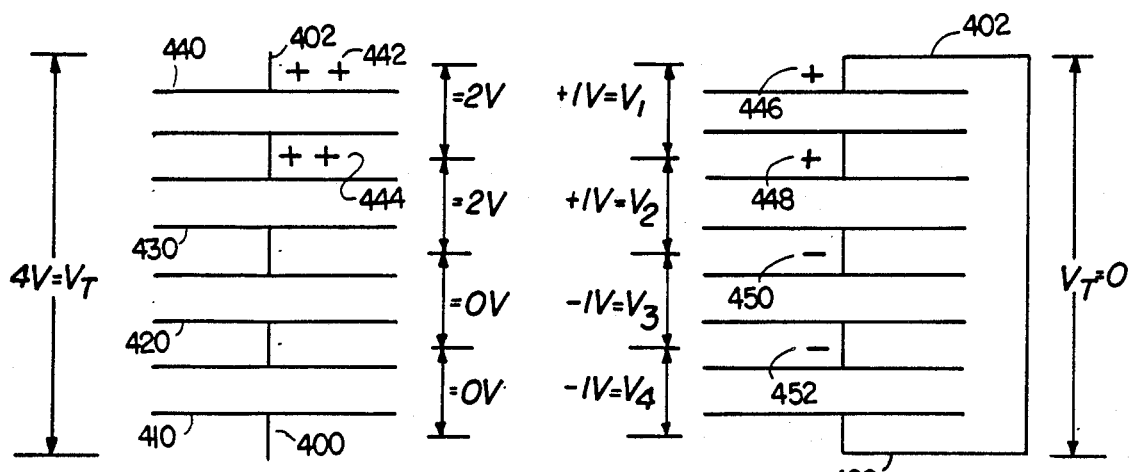
PRIOR ART
FIG 4a
PRIOR ART
FIG 4b
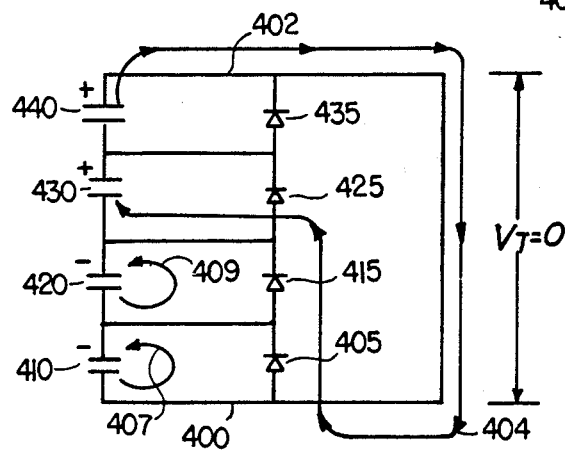
FIG 4c

REVERSE DISCHARGE DIODE CAPACITOR

BACKGROUND

A capacitor is designed to hold a large amount of charge and withstand the voltage that appears across its dielectric. If the capacitor is designed to store charge for a long period of time and discharge in a short period of time, in the order of μsec, it is termed an energy discharge capacitor. Typically these capacitors are used by charging them in parallel across a voltage and discharging them in series. Such banks of capacitors are used to produce a high voltage pulse of electricity.

One type of energy discharge capacitors is termed self-healing since it can still function after undergoing dielectric breakdown. These capacitors are constructed of a thin sheet of dielectric such as polypropylene which is coated on both surfaces with a thin (300 Angstroms) layer of aluminum. Each of the coated surfaces of the dielectric acts like a metal plate. Typically the dielectric sheet is three inches wide and 600 ft. long, providing a very large area for the accumulation of charge. Each surface has an electrical contact attached along an entire long edge of the surface. The thin sheet is wrapped so that it can be immersed in a relatively small oil filled cannister. The oil helps remove the heat generated during charging and discharging.

These capacitors are self-healing because once a dielectric breakdown occurs, there is a surge of current through the dielectric in the region of breakdown. This instantly causes a vaporization and oxidation of the aluminium in the region of the breakdown. The oxidation of the aluminium to alumina oxide creates an insulator which prevents further current flow in the region of damage. This vaporization and oxidation is termed clearing. Generally the clearing is restricted to a 1/16 in. diameter area around the breakdown site. With the area cleared the capacitor can then resume storing charge although with less capacitance due to the loss of a portion of the metalized material.

Since it is generally desirable to make capacitors with the ability to hold more charge or be charged to a higher voltage than is possible using a single sheet of metalized dielectric, capacitor manufacturers typically place more than one of these wrapped metalized dielectric sheets together in a single cannister. Each wrapped metalized dielectric sheet is termed a section. Sections connected in series result in the total voltage produced across the series being the sum of the voltages across the individual sections. Sections connected in parallel experience the same voltage but result in more charge being stored by the capacitor.

FIG. 1 depicts a typical multi-section capacitor. Sections connected in parallel, such as 10a and 10b each experiences a voltage across it of ($V_i$). The sections connected in series such as 10a, 12a, 14a experience voltages of ($V_i$, $V_j$, $V_k$), respectively, and the voltage across the entire series is ($V_T$), which is the sum of the voltages ($V_i$, $V_j$, $V_k$) of the individual sections 10, 12, 14. This total voltage ($V_T$) appears across the terminals of the capacitor 20, 22.

FIG. 2 depicts the voltage V across each individual section as a function of time. Referring to FIGS. 1 and 2, initially all sections are at zero voltage. At time $T_1$ the capacitor begins to charge and its voltage 106 increases until time $T_2$ when the capacitor reaches its working voltage ($V_T$) and the sections reach their operating voltage 108. At this time the operating voltage across each section is about $V_0$. At time $T_2$ a discharge 112 occurs and the voltage returns zero. At time $T_3$ charging begins again 116, but before the operating voltage ($V_0$) of the sections is reached, at time $T_4$, a dielectric breakdown 120 occurs one of the sections; in this example 10(b) of FIG. 1. Some of the charge across the capacitor sections 10(a) and 10(b) will recombine because of the failure of 10(b) and the resulting clearing process. This will cause the voltage ($V_i$) across these sections to drop, but the voltages across the other series sections ($V_j$, $V_k$) will not be effected. The circuit charging the capacitor is usually constructed to charge the capacitor to the designated operating voltage ($V_T$). When the capacitor is fully charged to ($V_T$), the voltage ($V_i$) across the section 10 that cleared will be less than normal due to the damage caused by the clearing. However, the voltage ($V_j$, $V_k$) across the other sections 12, 14 will be higher since the voltage across the capacitor ($V_T$) is the summation of ($V_i$, $V_j$, $V_k$). At time $T_5$ the capacitor is discharged 130 but because of a shifting of charge among the sections the voltage ($V_i$) goes 134 well below the zero potential, while the voltages ($V_j$, $V_k$) of the undamaged sections 12, 14 stay 136 above zero. This is true even though the voltage across the capacitor is now zero.

At time $T_6$, charging again resumes until time $T_7$ when a discharge 144 again occurs. The peak voltage 138 on the undamaged sections 12, 14 again exceeds the operating voltage ($V_0$) while the voltage across the damage section is less 140. At $T_8$ charging again occurs but before the charging is completed, another breakdown and clearing takes place 154 at time $T_{10}$.

Because this breakdown has taken place in a section, for example 12a, which was above the operating voltage ($V_0$), the damage and clearing was greater than in the previous breakdown 120. So the peak voltage 158 that section 12 will reach is less than the voltage 156 that the previously damaged section 10 reached at peak. Again, the charging circuit, in order to bring the voltage across the capacitor to the operating voltage ($V_T$), raises the voltage on the undamaged sections 160 above their normal operating voltage ($V_0$).

When the discharge occurs at $T_{11}$, the voltage 164 on the more damaged section 12 goes below zero, while the voltage on the previously damaged section 10 stays above 166, as does the voltage 168 on the undamaged section 14. At $T_{12}$ charging again occurs with the voltage 176 on the section 12 with the most damage remaining below the operating point ($V_0$) and the voltage 172, 174 on the others 10, 14 being forced above their normal operating point ($V_0$) by the charging circuit.

Because some sections are operating above the normal voltage for that section, that section is a candidate for failure. As more sections experience breakdown, the damage accumulates until the capacitor fails. The cause of this failure is that while the sections start with the same voltages across them, failures cause potential differences to appear between the sections. This in turn causes further failures and other potential differences to appear between sections. To avoid the total failure of a capacitor, it must be configured so as to remove the potential differences which arise between sections.

SUMMARY OF THE INVENTION

The capacitor disclosed herein comprises a number of sections connected in series and a device connected in parallel with each section. The device is non conductive when the section in which it is connected in parallel is of the normal polarity but conductive when the polarity of the section reverses.

In one embodiment, the device to conduct charge is a diode and resistor combination connected across each group of parallel sections, so as to be non conducting when the capacitor is charged but to become conducting when a clearing event causes the section to drop below the zero potential upon discharge.

In doing so, the voltage across all of the individual sections will be forced to zero upon discharge. This in turn removes the reason for forcing sections to voltages in excess of the normal operating voltages. The present invention enables a self healing capacitor with more than one group of sections in series to undergo repetitive clearing without the resulting potential differences between the series sections which causes additional failures.

Another aspect of the invention is a means for charging such a capacitor so that no section is ever charged to an overvoltage. In on embodiment the device charges the capacitor by placing a specified amount of charge on the capacitor.

DESCRIPTION OF THE PREFERRED EMBODIMENT

The drawing is briefly described as follows:

FIG. 3 is a schematic of an embodiment constructed in accordance with the present invention.

FIG. 4(a) is a schematic diagram of a series of capacitor sections, as known to the prior art, in which the sections are different potentials. FIG. 4(b) is a schematic diagram of the sections of FIG. 4(a) and the resulting charge distribution when the terminals are shorted. FIG. 4(c) is a schematic diagram of the present invention added to the circuit of FIG. 4(b).

Figure 5:
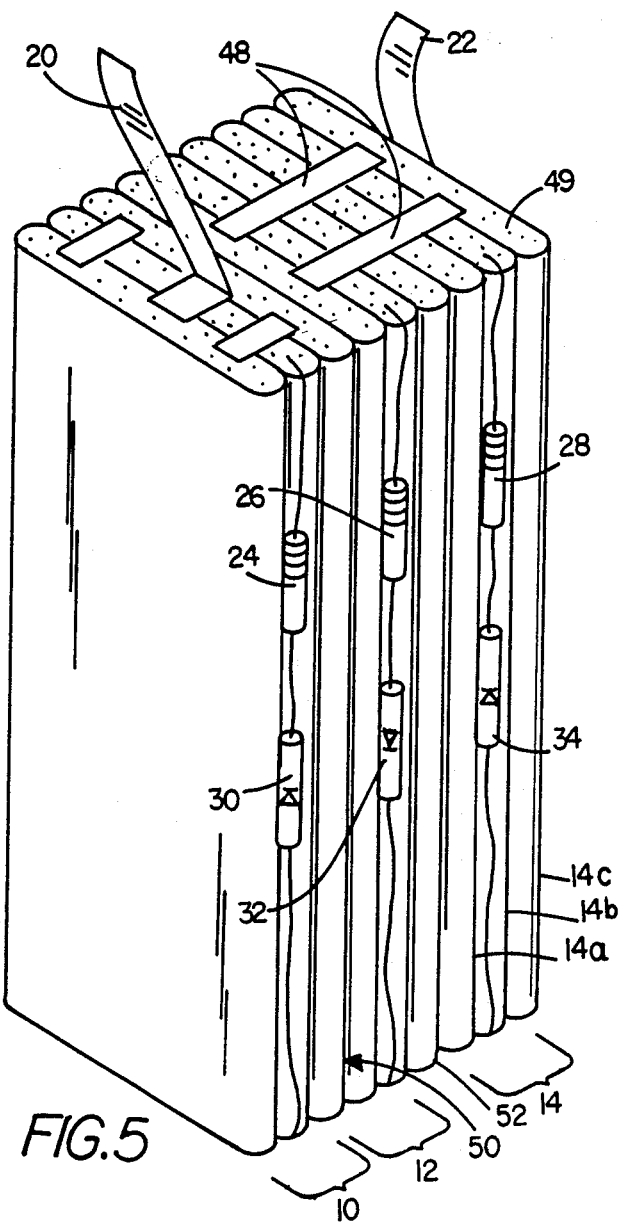

FIG. 5 depicts a perspective view of an embodiment of the invention.

Figure 6:
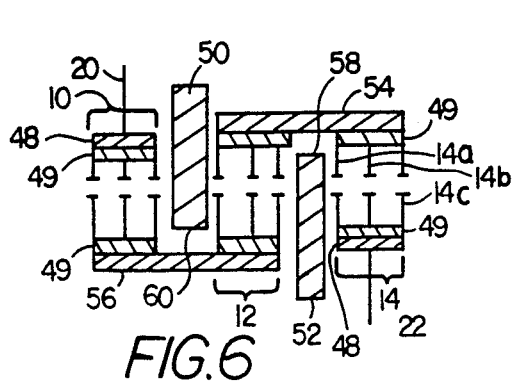

FIG. 6 is a schematic drawing of the connections shown in FIG. 5.

Figure 7:
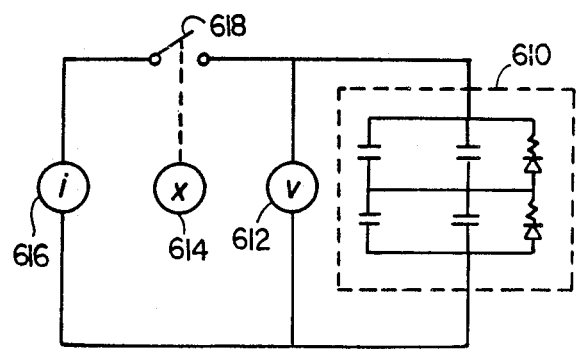

FIG. 7 is a schematic diagram of a maximum-q charging circuit.

An embodiment of the invention is shown in FIG. 3. As in the prior art, the capacitor is constructed of a group of capacitive sections 10, 12, 14 connected in parallel, (10 a,b), (12 a,b) (14 a,b) and in series (10a, 12a, 14a), (10b, 12b, 14b) and connected to the leads of the capacitor 20, 22. Across each group of parallel sections 10, 12, 14 is connected a diode 30, 32, 34 in reverse bias and a resistor 24, 26, 28. Biased in this direction, the diodes 30, 23, 24 will not normally conduct either when the sections 10, 12, 14 are charged or at zero potential.

Figure 1:
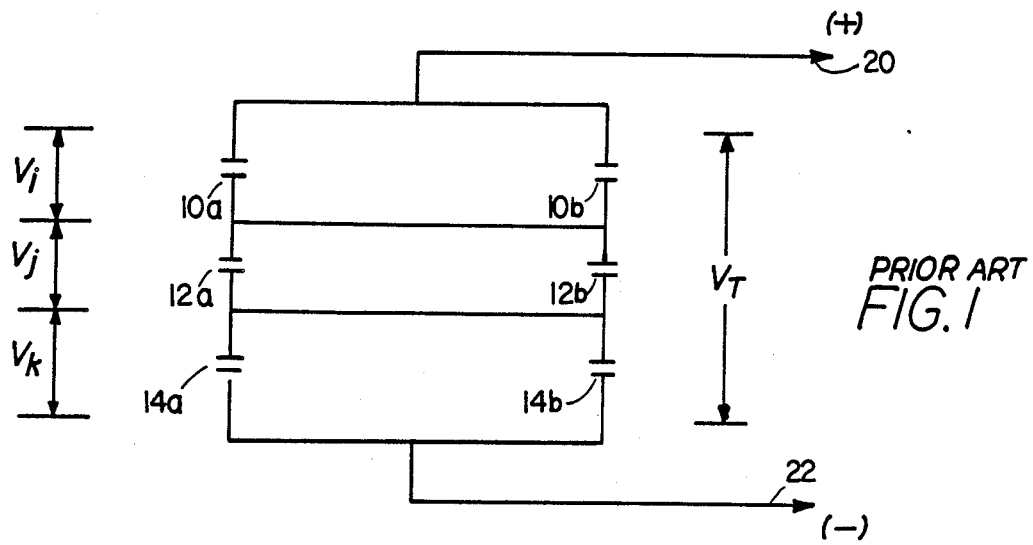
FIG. 1 is a schematic of a typical capacitor of the prior art constructed of six self-healing sections.
Figure 2:
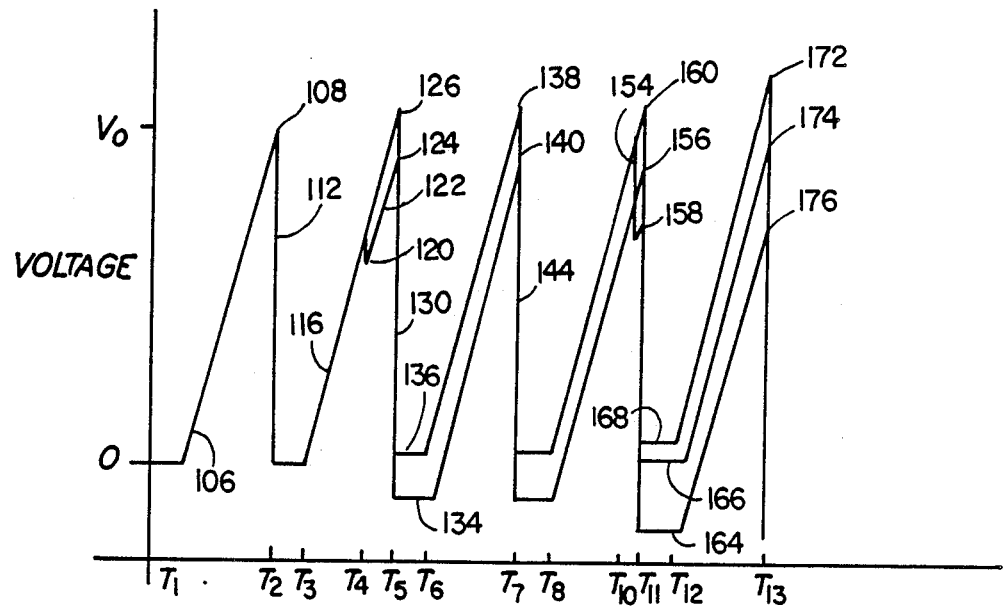
FIG. 2 is a voltage versus time graph of the prior art capacitor depicted in FIG. 1.

However when the potential across a section goes negative following a discharge after a clearing event (134 of FIG. 2), the diode associated with that section, becomes forward biased and conducts. This allows the charge to redistribute, bringing the potential across all the sections to zero. For this to occur, it is necessary that the terminals of the capacitor remain shorted after discharge.

Referring to FIG. 4(a), four capacitive sections connected in series have, for example, voltages ($V_1$, $V_2 = 2V$) across two of the sections and ($V_3$, $V_4 = 0V$) across the other two sections. This would be the situation after discharge if clearing events occurred for example in sections 410 and 420 during charging. The total voltage across the capacitor terminals 400 and 402 is equal to the sum of the voltages across the sections ($V_1 + V_2 + V_3 + V_4 = V_T = 4V$), and is caused by charges 442, 444 on sections 420, 440. Referring to FIG. 4(b), if the terminals 400, 402 are shorted together, the total voltage ($V_T$) across the capacitor becomes zero, but the rearrangement of charges 442, 444 on the sections results in negative charges 450, 452 appearing on sections 410, 420 resulting in voltages ($V_3$, $V_4$) across those sections of minus one volt. The remaining charges 446, 448 on sections 430, 440 result in voltages ($V_1$, $V_2$) of plus one volt.

So although the voltage ($V_T$) across the capacitor is zero, the individual sections retain a voltage difference which will not be eliminated by charging and discharging.

Referring to FIG. 4(c), if instead of simply shorting the terminals 400, 402 of the capacitor shown in FIG. 4(c), diodes 405, 415, 425, 435 in series with resistors (resistors not shown for clarity) are first connected in parallel with each section, upon the shorting of the terminals 400, 402, diodes 405 and 415 will be forward biased due to the negative potentials on sections 410 and 420. This will provide a discharge paths (shown by arrows 404, 407 and 409) to dissipate the charges and bring all the sections to the same potential. Again, for the invention to function it is necessary that the terminals 400, 402 remain shorted after discharge.

FIG. 5 depicts a series of nine sections connected as three parallel groups of three sections in series as they would appear for insertion in a cannister. Each group of three parallel sections 10, 12, 14 is connected in parallel with a resistor 24, 26, 28 and diode 30, 32, 34. Each parallel group is connected in series with other parallel groups using insulators 50, 52 and tabs 48. When assembled, the unit will be immersed in an oil cannister and the tabs 20, 22 will be connected to the capacitor terminals.

Referring to FIG. 6, each of the sections to be connected in parallel, for example 14(a), 14(b), 14(c), are placed in adjacency and the ends are coated with a conducting layer 49. Conducting tabs 48 further increase the conductivity across the sections.

One tab 56 of the parallel section 10 is used to connect the parallel sections 12, 14 in series. An insulator 50 is placed between the parallel sections 10,12 such that one end 60 of the insulator 50 can be bridged by tab 56. Similarly, tab 54 on the opposite end of parallel section 12 bridges the end 58 of insulator 52 to connect parallel sections 12 and 14. In this way parallel sections 10, 12, 14 are connected in series. Free tabs 20, 22 of the end parallel sections 10, 14 connect the sections to the capacitor terminals.

It will be apparent to one skilled in the art that the selection of the diode is governed by the diode's breakdown voltage and the peak operating voltage of the capacitor. The breakdown voltage must be such that the peak operating voltage across the section does not result in breakdown of the diode. Also, the diode and resistor must be selected to withstand the peak currents encountered when the diode conducts.

The resistor must be chosen to limit the maximum forward current of the diode. For optimum operation, it should be small enough so that the value of the resistance (R) times the capacitance of the sections connected in a group ($C_s$) is such that the value of five time constants (5RC$_s$) is less than the cycle time of the circuit in which the capacitors are used. The resistor must also be able to dissipate the power generated during current flow.

For example, in one embodiment, using a diode capable of withstanding a peak voltage of 12 KV at 350 milliamps requires that the resistors be at least 34k ohms. Typically, the resistors actually used are 10 megaohms and so the current is further limited. In this embodiment, the section across which the diode and resistor are connected has a capacitance of 30 uf so the time constant is about 1 sec. This means the cycle time must be about 5 sec. It is assumed that only a small portion of the section will be damaged at any time, so the resulting current flow will be further limited. As a result, the resistor need only dissipate about five watts of power.

It will also be apparent to one skilled in the art that a group of individual single section self-healing capcitors could be connected as shown in FIG. 3 but with the resistors and diodes external to the cannisters. In this way, in the way the benefits of the invention may be obtained without the necessity of changing the design of the individual capacitors.

Referring to FIG. 7, it is possible to further limit the overcharging of any section and thereby reduce damage by the use of maximum-q charging. Instead of charging the capacitor 610 to a voltage (V$_T$), a current source 616 is used to place a defined amount of charge on the capacitor 610. A constant current source 616 is connected through a switch 618 controlled by a timer 614. The capacitor 610 is allowed to charge for a fixed time (t) and thereby store a defined amount of charge. At the end of time (t) switch 618 opens and the potential across the capacitor 610 measured with a voltmeter 612.

If a clearing occurs, the capacitor 610 will be able to store less charge and the voltage across its terminals will be less than specified. In this way no section is ever charged above its normal operating voltage to compensate for cleared section. Since no section is ever overstressed, secondary failures are less likely. A secondary benefit of this technique is that clearings can be detected since the specified terminal voltage is not achieved following the clearing process. In addition the failing capacitor can be replaced when too many clearings have occured.

Having shown the preferred embodiment, those skilled in the art will realize many variations are possible which will still be within the scope and spirit of the claimed invention. Therefore, it is the intention to limit the invention only as indicated by the scope of the claims.

What is claimed is:

1. A method for charging a self-healing capacitor, comprising two sections connected in series, such that no section will be charged above its normal operating voltage, each section comprising a thin sheet of dielectric coated with metal, and the sheet of metal-coated dielectric being subject to dielectric breakdown followed by a clearing event (in which the surge of current through the dielectric in the region of the breakdown causes a change of the metallizing to occur that prevents further current flow), said method comprising the steps of placing a known amount of charge on the capacitor and determining its voltage.

2. A device for charging a self-healing capacitor, comprising two sections connected in series, such that no section exceeds its normal operating voltage, each said section comprising a thin sheet of dielectric coated with metal, and the sheet of metal-coated dielectric being subject to dielectric breakdown followed by a clearing event (in which the surge of current through the dielectric in the region of the breakdown causes a change of the metallizing to occur that prevents further current flow), said device comprising an apparatus for placing a fixed amount of charge on said capacitor and an apparatus for measuring the potential across the capacitor.

3. The device in claim 2 where said apparatus for placing a fixed amount of charge on said capacitor is a constant current source in series with a time-controlled switch.

4. The device in claim 2 where said apparatus for measuring the potential across the capacitor is a voltmeter.

5. A self-healing capacitor comprising:
a plurality of metallized capacitive sections connected in series, each section comprising a thin sheet of dielectric coated with metal, and the sheet of metal-coated dielectric being subject to dielectric breakdown followed by a clearing event (in which the surge of current through the dielectric in the region of the breakdown causes a change of the metallizing to occur that prevents further current flow);
at least one conduction control device connected in parallel with one of said sections, said conduction control device being conductive when the section to which it is connected becomes reverse polarized as a result of a said clearing event, and non-conductive otherwise; and
a canister to house said capacitive sections and said conduction control device.

6. The metallized foil capacitor of claim 5 in which each conduction control device comprises a diode.

* * * * *